United States Patent Office 3,058,302
Patented Oct. 16, 1962

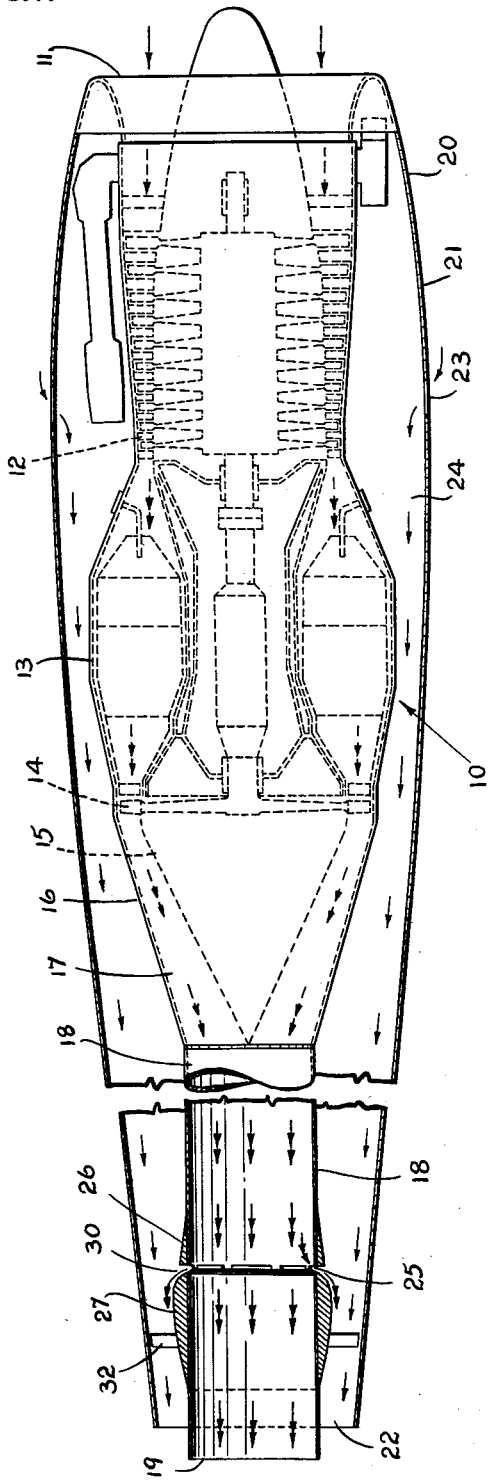

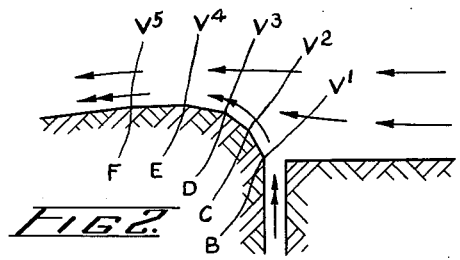
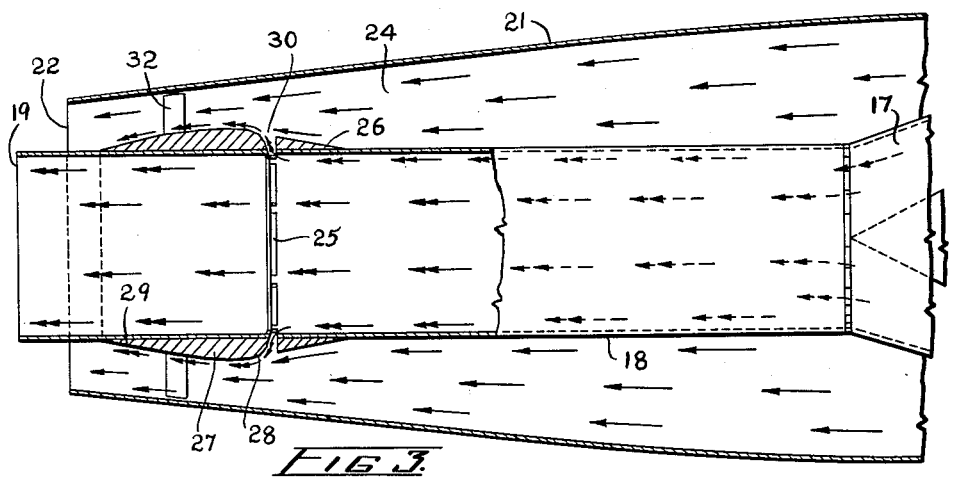
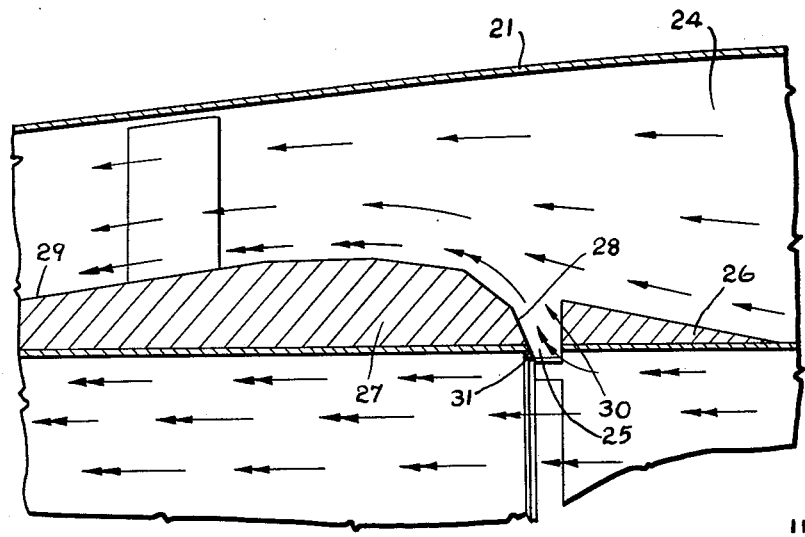

3,058,302
MEANS INDUCING A FLOW OF COOLING AIR FOR GAS TURBINE ENGINES
William Kuzyk, Weston, Ontario, Canada, assignor to Avro Aircraft Limited, Malton, Ontario, Canada, a corporation
Filed Feb. 7, 1955, Ser. No. 486,315
3 Claims. (Cl. 60—35.6)

This invention relates to cooling means for internal combustion engines, and more particularly to cooling means for an engine in which the means for propulsion is derived from an efflux of high speed gases from a nozzle as in the gas turbine engine.

It is well known to those skilled in the art that gas turbine engines operate at extremely high temperatures and means must therefore be employed to cool the engine and its surrounding and supporting structure or nacelle. Conventionally this is done by providing an air intake near the front of the engine into which ram air is caused to flow. The cooling air is ducted rearwardly through the annular space between the engine and its surrounding structure and in so doing passes over the combustion chambers, the nozzle box and the tail pipe. The cooling air finally is exhausted to atmosphere through an annular outlet surrounding the tail pipe nozzle through which the main stream of gases from the engine is caused to flow.

Basically, the above-described cooling means is the one which is commonly used in the industry. There may be certain minor variations of detail in which ducting and baffles are employed within the nacelle to cause a predetermined flow condition to take place around the engine. However, the system consists generally of a forward intake into which cooling air is constrained to flow, an annular chamber between the engine and the nacelle, and an annular outlet which mixes the cooling air flow with the main exhaust gases.

There is, however, one main disadvantage in all of these systems. In the mixing of the cooling air flow and the high energy exhaust gases, there is a noticeable decrease in thrust output. This loss of efficiency is as high as from 2% to 5% of the total thrust output.

It is the main object of this invention, therefore, to cool a gas turbine engine and its nacelle without decreasing the efficiency of the engine. A slight but significant increase in thrust will be shown to be obtainable by the use of the system described herein.

It is a further object of the present invention to provide in an aircraft gas turbine engine a cooling system in which an adequate flow of cooling air is available even when the aircraft is at rest.

The invention is more particularly described with reference to the accompanying drawings in which like reference characters refer to like parts and in which:

FIG. 1 is a side elevation of a gas turbine engine embodying a cooling system constructed in accordance with the invention;

FIG. 2 is a diagram illustrating the aerodynamic phenomenon known as Coanda effect employed in this invention and which is explained hereunder;

FIG. 3 is a longitudinal section of the tail pipe of a gas turbine utilizing the cooling means of this invention; and FIG. 4 is an enlarged version of a portion of FIG. 3 showing in detail the Coanda slot.

Referring to the drawings, FIG. 1 shows a gas turbine engine 10 having an annular air intake 11, a compressor 12, a combustion system 13 and a turbine 14. The engine structure aft of the turbine essentially is a duct, which includes a tail bullet 15 around which is a tail cone 16, providing an annular passage 17; fastened to the tail cone 16 is a rearwardly extending tail pipe 18 terminating in a main exhaust outlet 19. The whole assembly is enclosed within a hood or nacelle 20 having walls 21 which are substantially circular in cross-section and the forward ends of which converge to blend with the wall of the annular intake 11. The rearward end of the nacelle and the tail pipe together provide an annular nozzle 22.

Cooling air enters the nacelle through apertures 23 and it passes into an annular chamber or passage 24 which surrounds the engine 10. The chamber 24 is of sufficiently large volume so that the air within it has, for all practical purposes, zero velocity or is at least drastically reduced from its initial inlet velocity.

A narrow, almost continuous peripheral slot 25, as shown in FIGS. 1, 3 and 4, is cut into the aft portion of the tail pipe 18 and has at its forward boundary a peripheral ring 26 fast to the outer wall of the tail pipe 18; the ring 26 is substantially triangular or wedge-shaped in cross-section. The ring has its thickest portion adjacent to, and in the same transverse plane as, the forward edge of the slot 25, and it gradually tapers upstream from the slot until it merges with the wall of the tail pipe 18. A peripheral ring 27 of generally aerofoil cross-section and having leading and trailing edges 28 and 29 respectively, encompasses the tail pipe and is suitably fastened to it; the leading edge of the ring 27 bounds the aft edge of the slot and extends rearwardly therefrom. The rings 26 and 27 will most conveniently be made as formed sheet metal structures welded to the tail pipe in the position indicated, although they have been shown in the drawings as solid components, for the sake of clarity. Theoretically, the leading edge 28 of the ring 27 is not a continuous curve but is described by a finite number of straight lines which are at slopes relative to the tail pipe which gradually decrease in a downstream direction. However, practical concepts make is preferable to construct the ring 27 as a continuous curve having no discontinuities, and results indicate that the flow characteristics are substantially the same in both cases. The ring 26 and the ring 27 with its leading edge 28 and trailing edge 29 provide an annular nozzle generally indicated at 30 which is constructed in accordance with the teachings of Henri Coanda as disclosed in his United States Patent No. 2,052,869. A small lip 31 (see FIG. 4) attached to the downstream edge of the slot 25 and which projects inwardly into the jet pipe may be provided to assist the passage of exhaust gases through the nozzle 30. Struts 32 firmly attached to the walls of the nacelle, project radially inward and are in sliding but supporting engagement with the aft section of the tail pipe 18.

FIG. 2 is a diagram illustrating the aerodynamic phenomenon known as "Coanda effect" employed in this invention as the means for inducing a flow of cooling air through the passage 24. It is well known to those skilled in the art that if one of the edges of a nozzle's mouth of rectangular cross-section be lengthened and removed continuously from the initial direction of the flow, the fluid passing through the nozzle is deflected from its initial direction and follows the surface of the lengthened edge. Furthermore, the velocity of this flow increases considerably with every decrease in the angle of the extended edge relative to the longitudinal axis. As a result of the velocity increase at each increment of angle a corresponding drop in pressure occurs and the surrounding gases are entrained with the flow from the nozzle.

By reference to FIGS. 1 and 4 it can be seen how the Coanda effect is applied to the cooling of a gas turbine engine. Ambient air is admitted to the chamber 24 through the apertures 23 where, as previously mentioned, the relatively large cross-sectional area of this chamber reduces the velocity of the cooling air almost to stagnation. A small portion of the exhaust gases passing through the tail pipe 18 is diverted into the annular nozzle 30 by means of the lip 31. After entering the nozzle the exhaust gases are influenced by the configuration of the ring 27 in accordance with the known aerodynamic phenomenon known as "Coanda effect" so that they are deflected from their original path and are in effect "bent" around the leading edge 28 of the ring 27 until they flow along the outer wall of the aft portion of the tail pipe 18. The bending of the exhaust gases around the ring 27 causes an increase in velocity of the said gases and a corresponding decrease in pressure; this drop in pressure causes the surrounding cooling air in the chamber 24 to be entrained with the high speed gases so that there is an extraction effect. The turbine exhaust gases and the cooling air mix and are exhausted into the jet stream through the annular nozzle 22 surrounding the main exhaust outlet 19.

The main advantages of the construction described lie in its ability to provide a more efficient extractor effect than heretofore known, and also to provide some augmentation to the main thrust component. This latter advantage is due to the fact that with the Coanda nozzle it is possible to energize some of the cooling air.

It has been shown experimentally that a ratio of "sucked air mass" to "Coanda jet mass" of as high as 20:1 may be attained. Furthermore, a thrust augmentation of 1.7 times the original Coanda nozzle thrust can be achieved simultaneously with this high value of entrainment.

By reference to FIG. 2 is it will be seen that the Coanda nozzle flow has an initial velocity of $V^1$ at point B and as the flow passes point C, the velocity increases to $V^2$ and so on until at point F the velocity is equal to $V^5$ where:

$$V^5 > V^4 > V^3 > V^2 > V^1$$

This gradual increase in velocity is accompanied by a corresponding decrease in pressure which induces the almost stagnant air in the annular chamber to be entrained with the flow from the Coanda nozzle.

With further regard to the thrust augmentation gained from the use of the Coanda nozzle a study of the United States Combined Intelligence Objectives Sub-Committee Report entitled "The Coanda Effect," prepared by 1st Lt. R. S. Sproule and Lt. S. T. Robinson, Item #5, File #IX–1, X–2, XII–1 shows that:

$Fe = Fg - \Delta Fg +$ thrust augmentation due to use of Coanda nozzle
$= Fg - \Delta Fg + 2.7 \Delta Fg$
$= Fg + 1.7 \Delta Fg$ where $Fe =$ effective gross thrust
$Fg =$ gross thrust
$\Delta Fg =$ initial Coanda nozzle thrust In other words, because of the marked increase in velocity of the gas issuing from the Coanda nozzle, the ambient air within the annular chamber is accelerated to such a speed that it does not detract from the gross thrust. Furthermore, a significant portion of the drag loss at the apertures 23, which loss is energy absorbed by the cooling air as it enters the apertures, is now recovered in the form of propulsive thrust. In a conventional extractor, as presently used on gas turbine engines, there is a loss in gross thrust of from 2% to 5% due to the fact that the low speed cooling air in mixing with the jet efflux absorbs heat, thus resulting in a net decrease in energy potential. Furthermore, a drag loss of approximately 2% is incurred at the cooling air intakes. This results in a total loss of net thrust due to cooling of the order of 4% to 7%. Incidentally, it should be mentioned that net thrust equals gross thrust minus drag.

In a gas turbine engine employing the present invention the recovery of energy acquired by the air as it enters the cooling air intakes provided by the apertures 23 is about 25%, leaving a loss in net thrust due to the drag at the intakes of about 1.5%. Since the subject invention obviates any loss in thrust resulting from the mixing of low speed cooling air with the exhaust gases, it can be seen that there is a net increase in engine performance (net thrust) of from 2.5% to 5.5% over and above engines employing known methods of extraction.

The invention is not limited to use on gas turbine engines but can readily be adapted for use with reciprocating internal combustion engines. It will be understood, therefore, that the form of the invention described is to be considered merely as an example and changes in shape, size and arrangement of parts may be made without departing from the spirit of the invention or the scope of the subjoined claims.

What I claim as my invention is:

1. In an internal combustion engine having a duct defined by an enclosing wall for exhausting the products of combustion to atmosphere, and a hood spaced from and surrounding the duct wall to provide a passage leading from a source of cooling air passing over said duct and exhausting to atmosphere, means inducing a flow of cooling air from the source and through the passage, the said means comprising a transverse slot in the duct wall for the flow of products of combustion from the duct and into the passage, the slot having parallel forward and aft edges which are transverse to the general direction of the flow of products of combustion, and a member secured to the exterior of the duct wall circumscribing the same, and having a leading edge which bounds the aft edge of the slot, the surface of the member being at a slope relative to the wall which gradually decreases in a downstream direction, the slot and the member constituting a Coanda nozzle.

2. In an internal combustion engine having a duct defined by an enclosing wall for exhausting the products of combustion to atmosphere, and a hood spaced from and surrounding the duct wall to provide a passage leading from a source of cooling air passing over said duct and exhausting to atmosphere, means inducing a flow of cooling air from the source and through the passage, the said means comprising a transverse slot in the duct wall for the flow of products of combustion from the duct and into the passage, the slot having parallel forward and aft edges which are transverse to the general direction of the flow of products of combustion, a member secured to the exterior of the duct wall, circumscribing the same, and having a leading edge which bounds the aft edge of the slot, the surface of the member being at a slope relative to the wall which gradually decreases in a downstream direction, and a member which is generally triangular in cross-section secured to the outside of the duct wall, circumscribing the same, and having a forwardly sloping edge portion which blends with the exterior surface of the duct wall and a generally radial aft edge portion in alignment with the forward edge of the slot and which is disposed substantially perpendicular to the plane of the duct wall, the slot and the members constituting a Coanda nozzle.

3. In a gas turbine engine substantially encased within a hood or nacelle and having an inlet through which air is drawn for compression in a compressor, a combustion system wherein fuel is added and burned in the compressed air, a turbine driving the compressor and driven by the expanding products of combustion, and a tail pipe providing an exhaust outlet through which the products of combustion are exhausted to atmosphere to furnish a propulsive thrust, the nacelle overlying the engine in spaced relation thereto to provide a passage leading from a source of cooling air passing over said duct and exhausting to atmosphere, means for inducing a flow of cooling air from the source and through the passage, the said means comprising a narrow peripheral slot in the tail pipe for the flow of products of combustion from the tail pipe and into the passage, the slot having parallel forward and aft edges which are transverse to the general direction of the flow of products of combustion, and a ring secured to the exterior of the tail pipe and having a leading edge which bounds the aft edge of the slot, the surface of the ring being at a slope relative to the tail pipe which gradually decreases in a downstream direction, the slot and the ring constituting a Coanda nozzle.

References Cited in the file of this patent

UNITED STATES PATENTS

| | | |
|---|---|---|
| 2,198,655 | Coanda | Apr. 30, 1940 |
| 2,419,866 | Wilson | Apr. 29, 1947 |
| 2,579,114 | Halford et al. | Dec. 18, 1951 |
| 2,590,457 | Pouit | Mar. 25, 1952 |
| 2,597,253 | Melchoir | May 20, 1952 |
| 2,599,879 | Walker | June 10, 1952 |
| 2,623,356 | Coanda | Dec. 30, 1952 |
| 2,631,796 | Williamson et al. | Mar. 17, 1953 |
| 2,651,172 | Kennedy | Sept. 8, 1953 |
| 2,652,216 | Hoffman | Sept. 15, 1953 |
| 2,653,445 | Halford et al. | Sept. 29, 1953 |
| 2,735,633 | Manning | Feb. 21, 1956 |

OTHER REFERENCES

Alford: Abstract of application Serial No. 104,281, published May 20, 1952, 658 O.G. 916.